Figure 1:
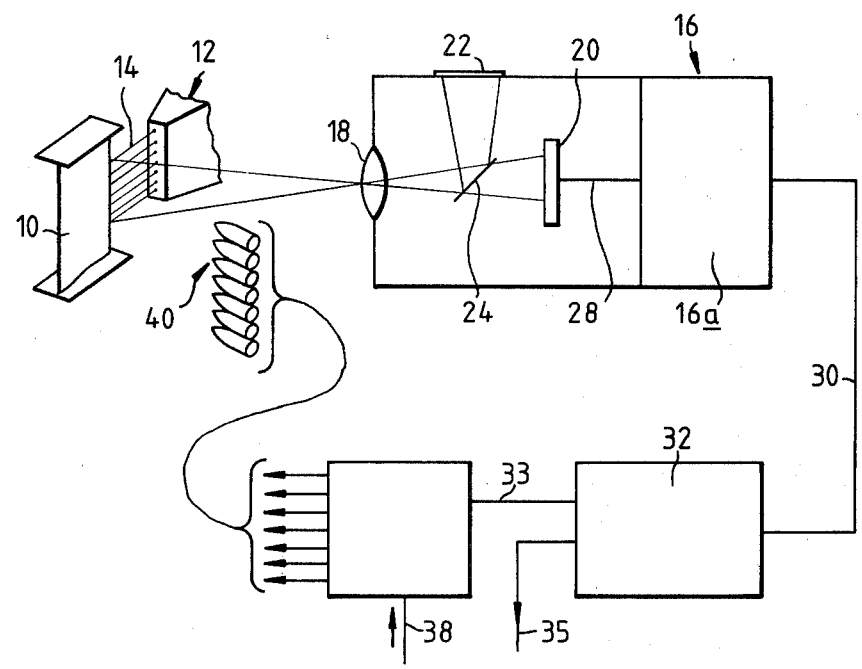

United States Patent [19]

Gardner et al.

[11] 4,387,009

[45] Jun. 7, 1983

[54] METHOD OF OPERATING ELECTROCHEMICAL MACHINE TOOL

[75] Inventors: Charles S. Gardner, Allestree; Robert B. Price, Burton-on-Trent; Keith G. Tillen, Mickleover, all of England

[73] Assignee: Rolls-Royce Limited, London, England

[21] Appl. No.: 311,397

[22] Filed: Oct. 14, 1981

[30] Foreign Application Priority Data

Feb. 12, 1980 [GB] United Kingdom ............... 8038631

[51] Int. Cl.³ ........................... B23P 1/00; B23P 1/16
[52] U.S. Cl. ............................ 204/129.2; 204/129.55; 204/129.6; 204/129.7
[58] Field of Search ............ 204/129.1, 129.2, 129.55, 204/129.7, 224 M, 228, 129.6

[56] References Cited

U.S. PATENT DOCUMENTS

| | | | |
|---|---|---|---|
| 3,403,084 | 9/1968 | Andrews | 204/129.6 X |
| 3,509,304 | 4/1970 | Moore | 204/129.7 X |
| 3,810,829 | 5/1974 | Fletcher | 204/129.7 X |
| 3,827,963 | 8/1974 | Callahan | 204/228 |
| 3,990,959 | 11/1976 | Payne et al. | 204/224 M X |
| 4,289,947 | 9/1981 | Inoue | 204/129.7 X |

FOREIGN PATENT DOCUMENTS

| | | | |
|---|---|---|---|
| 41-12848 | 7/1966 | Japan | 204/129.2 |
| 396229 | 1/1974 | U.S.S.R. | 204/224 M |
| 776834 | 11/1980 | U.S.S.R. | 204/129.2 |

Primary Examiner—Donald R. Valentine
Attorney, Agent, or Firm—Cushman, Darby & Cushman

[57] ABSTRACT

Multiple hole drilling by the electro-chemical process, in which individual jets of electrolyte impinge upon a workpiece, presents problems in assessment of hole depth reached and/or of jet deflection through jet orifice blockage. The invention provides a device which looks for the corona at the head of each jet. If the corona is present, the device generates and electrical signal which inhibits the actuation of a further device the function of which is to remove the jet, the corona of which has extinguished. Device also senses the displacement of the corona from a datum and in response, initiates switch off the machine tool.

3 Claims, 4 Drawing Figures

U.S. Patent Jun. 7, 1983 Sheet 1 of 2 4,387,009

4,387,009

METHOD OF OPERATING ELECTROCHEMICAL MACHINE TOOL

This invention relates to control apparatus for a machine tool which removes metal electrochemically.

More particularly, though not restrictively, the invention relates to control apparatus for an electrochemical machine tool which issues electrolyte in jet form onto a workpiece surface for the purpose of boring a hole or holes. Such devices are used for example, to produce holes in the aerofoils of turbine blades for gas turbine engines.

It is the practice, to judge the depth to which a hole has penetrated, on a time basis. The time required to establish a given depth, is selected after relating a number of parameters namely, the composition of the material being machined, the electrolyte composition and temperature and the voltage across the machine tool head and workpiece; Knowing these parameters, the machining rate is observed. At the end of the selected time, the machine is switched off manually or automatically. Production runs can be achieved provided the parameters are constantly maintained.

Drawbacks are experienced where the metal being machined is not of uniform thickness. It is a drawback, even if the thickness is known at all positions on the workpiece, if more than one hole is to be drilled at the same time, because one or more jets may break through before the remainder, or break through though such a result may not be required. In such circumstances the known control method and apparatus, based on time, may not be usable.

The present invention seeks to provide both an improved method and apparatus for controlling an electrochemical machine tool.

According to the present invention a method of controlling an electrochemical machine tool from which electrolyte issues in jet form, to strike a workpiece and which during the machining process generates a corona at the place or places of contact with the workpiece, comprises the steps of observing the or each corona, generating an electrical voltage representative thereof and using said voltage to control the operation of one or more air jets, the or each of which is aligned with a respective electrolyte jet, so as to blow a respective jet or jets off the workpiece and effectively stop the machining action thereof.

The method may include observing the displacement if any of the or each corona relative to a datum and generating a voltage signal indicative of said observed displacement if any and utilising said signal to trigger disablement of the machine tool.

The invention further provides apparatus comprising light actuated, signal generating means, means for focussing light on said light actuated signal generating means, signal manipulating means for conditioning and sending said signal or signals to an air valve actuator, at least one air valve connected to said actuator and having an outlet nozzle connected to one end and adapted for connection to a pressurised air supply at the other end.

The apparatus may include means for detecting displacement if any, of a jet or jets relative to a datum.

Figure 2:
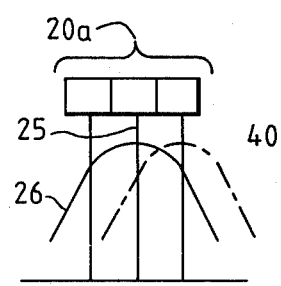
Figure 3:
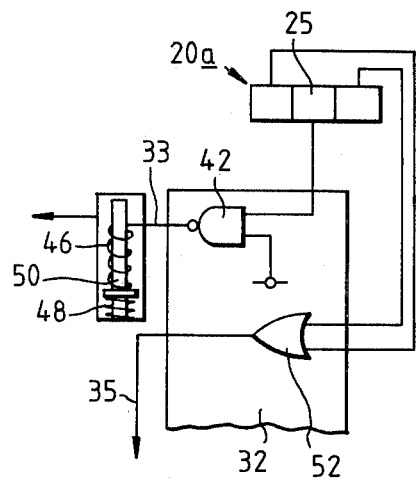
Figure 4:
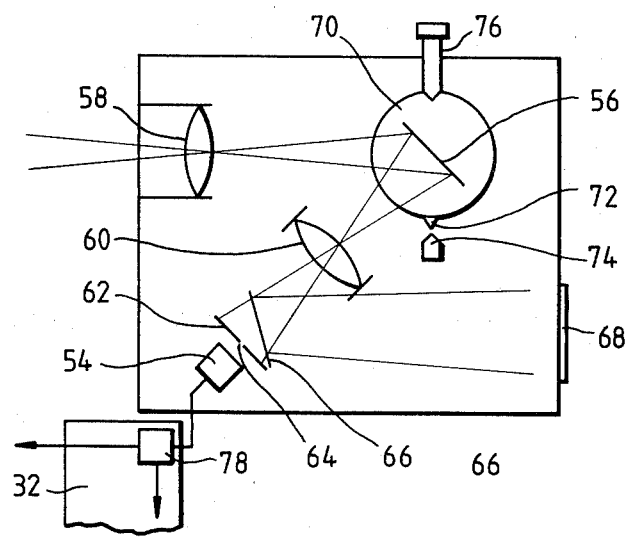

The invention will now be described with reference to the accompanying drawings in which:

FIG. 1 is a diagramatic view of apparatus in accordance with an embodiment of the invention, FIG. 2 is a part diagramatic view of an electrical wave form, representing light intensity, FIG. 3 is a part circuit diagram, FIG. 4 is a diagramatic view of a further embodiment of the invention.

In FIG. 1, a turbine blade 10, is positioned with respect to the machining head 12 of an electrochemical machine tool. The electrochemical machine tool is essentially similar to that described and claimed in British Pat. No. 1,339,544.

Head 12 ejects a number of fine electrolyte jets 14 onto the edge of blade 10, so as to drill holes in it, which holes (not shown) eventually break into a passage (not shown) which extends the length of the blade 10.

During the machining action, the electrical potential across the machine tool head 12 and blade 10 is set at a value which results in a corona i.e. an ionized zone, developing in the splashed back electrolyte at the junction of each jet and blade 10. The coronas are visible to the naked eye and appear as bright blue lights, the intensity of which is greatest at the corona centre.

A device, indicated generally by the numeral 16 is supported on the compound slide (not shown) of the machine tool (not shown) and includes a focussing lens 18, an array 20 of diodes and a datum screen 22. Datum screen 22 is looked at from outside and has graduations thereon which are positioned with respect to the array 20 of diodes, for reasons which are described hereinafter.

A removable mirror 24 is placed intermediate of lens 18 and diode array 20 and is arranged so as to reflect the images of the coronas onto the graduations on the screen 22. Device 16 is moved via the compound slide (not shown) so that accurate alignment of the images is achieved. Thereafter, mirror 24 is removed.

As stated hereinbefore, there is a positional relationship between screen 22 and diode array 20 and it is such that, when the corona immages are correctly aligned with the graduations (not shown) on screen 22, they are also correctly aligned with given banks of photo diodes in the array 20. Referring briefly to FIG. 2, in the present example three photo diodes 20 from the array 20 are arranged so as to span the width of a given corona. The amplitude of the brightness of the corona is represented vertically in volts and represented in a proper position relative to a datum 25, by full line 26.

Referring again to FIG. 1. After correct alignment of the coronas with respect to the photo diode array 22, lens 18 is moved in known manner so as to correctly focus the coronas with respect to the photo-diode array 20.

The alignment and focussing of the coronas may be carried out with the aid of a test piece (not shown) rather than a production workpiece. The test piece must be of the same material, and at least its surface to be machined by the jets and its location surfaces must both be identical with corresponding features on a production piece i.e. blade 10 in the present example.

During operation, each corona, if conditions are correct, will affect its respective photo-diode group 20a such that a signal in voltage form will be generated, which form will be as depicted by full line 26 in FIG. 2. The voltage signal will be produced in a known circuit contained in portion 16a of device 16, to which each diode group 20a is connected via a respective line 28.

In ideal conditions, the coronas will exist in a steady state by virtue of the machining voltage and electrolyte pressure, which latter integer dictates the degree of splash back, retaining values of constant respective magnitudes. When any electrolyte jet breaks through the wall of blade 10, the splash back will be obviated, because there is no longer any obstacle to the flow of electrolyte. It follows that, the particular diode group 20a will cease to be affected and its voltage signal will disappear.

Portion 16a of device 16 is connected via line 30, to a microprocessor 32 which in turn is connected via line 33 to control a number of solenoid valves (not shown) in box 34 and via line 35 to a machine tool stop mechanism (again not shown).

The solenoid valves (not shown) in given circumstances to be described hereinafter, allow high pressure air to pass from a supply line 38 to one or more nozzles 40, each of which is aligned with a respective electrolyte jet 14.

Photo diodes 20a effectively propagate three different signals which are:

(a) a voltage (line 26, FIG. 2) which is correctly positioned with respect to datum 25

(b) the same voltage but displaced from datum 25, as shown by the chain dotted line 40 in FIG. 2. The displacement indicates that an orifice in machine tool head 12 is obstructed, resulting in the deflection of an electrolyte jet. This in turn displaces the associated corona with respect to its datum on screen 22.

(c) no voltage, which indicates that the corona has been extinguished by virtue of the jet of electrolyte breaking through the wall thickness of blade 10, thereby obviating splash back.

Microprocessor 32 is connected to receive all of the effective signals, identify them and react by continuing to inhibit or activate, the solenoid valve actuating means or the machine tool stop means, depending on the signal received.

One way of achieving signal identification and usage thereof is illustrated in FIG. 3 where the datum photo-diode 25 is connected to an input of a NAND gate 42. A further input is supplied from line 44. During normal operation, both inputs are at 1, but the output is 0. A solenoid 46 is thus disabled and a spring 48 urges air valve 50 into a closed position. Should the respective corona be extinguished, the input from photo-diode 25 will go 0, so the output of the NAND gate 42 will be 1. Solenoid 46 will be enabled and will overcome spring 48 and thus will open air valve 50, allowing pressurised air to flow to and out of an associated nozzle 40.

It will be seen, that each electrolyte jet will need its own NAND gate 42 for control purposes.

An OR gate 52 is provided, to control the machine tool "off" switch (not shown). If a jet 14 is deflected, depending on direction of deflection, a photo diode on one side of datum 25 will react and will be applied to one of the OR gate inputs, resulting in an output being sent to the "off" switch (not shown) thus activating it and disabling the machine tool.

An OR gate 52 will be provided for each electrolyte jet used.

In FIG. 4 an alternative embodiment is depicted which incorporates effectively a single photo-diode 54 which receives in turn, the light from each corona. A rotating mirror 56 sweeps the coronas, the lights of which are focussed on mirror 56 via a lens 58.

Mirror 56 reflects the corona lights via a further lens 60 onto a plate 62 which has a slot 64 therein. Slot 64 is just wide enough to pass a light band which represents the central portion of a corona.

A setting mirror 66 and a datum screen 68 are also provided for ensuring that the slot 64 and the coronas are properly aligned as has been described hereinbefore in connection with the embodiment of FIG. 1. After alignment has been achieved, mirror 66 is removed.

The base 70 upon which mirror 56 is mounted for rotation therewith, has a pip 72 on its side. A pip position sensing device 74 of any suitable known kind is fixed relative to base 70 so that, each time base 70 and thus mirror 56 completes a rotation, sensing device 74 senses the completion of the rotation and generates a signal which sets a timer device (not shown).

An anti rotation lock 76 is provided and in the present example, consists of a spring loaded plunger, by means of which base 70 may be locked against rotation, whilst setting mirror 66 and datum screen 68 are being used.

Assuming proper working of all coronas, the output of photo diode 54 will be sinusoidal. It can therefore, if desired, be applied to e.g. a Schmitt trigger 78 which will accept that portion at the top of each wave of the wave form and emit a square pulse as a result, in known manner. A device (not shown) generating a reference voltage can be provided and compared against the output of the Schmitt trigger. If the output from the Schmitt trigger falls below the reference voltage value, it would indicate that a corona has extinguished with the result that a pulse is omitted on a given revolution of mirror 56. A signal is derived from the voltage difference and, as it is related to the time datum device 74, the derived signal is related to a particular solenoid valve and is used to actuate that valve, so as to cause air to blow the associated electrolyte jet from the workpiece.

In the case of a deflected jet, brought about by blockage of the jet orifice, the pulse at full amplitude will be developed at some time between two normally produced pulses and therefore, can be sensed by the microprocessor and identified thereby, as a pulse originating from a displaced corona. The microprocessor can then instruct machine tool disablement.

The circuitry disclosed herein is only disclosed by way of example and, having perceived the desired function of the apparatus from the description herein, the man skilled in circuitry will be able to design suitable means to achieve that function.

We claim:

1. A method of controlling an electrochemical machine tool from which electrolyte issues in jet form to strike a workpiece, and which during the machining process, generates a corona at the place of contact of electrolyte jet and workpiece, comprising the steps of aligning an air jet device with said electrolyte jet, observing the corona, generating a first electrical signal from said observation and using the presence and absence of said signal as the primary control over the operation of said air jet device which is aligned with said electrolyte jet for the purpose of directing air onto said electrolyte jet and blowing said electrolyte jet off the workpiece so as to effectively stop the machining action thereof.

2. A method of controlling an electro chemical machine tool as claimed in claim 1 including the step of using the absence of said signal to cause operation of said air jet to blow said electrolyte jet off the workpiece so as to effectively stop the machining action.

3. A method of controlling an electro chemical machine tool as claimed in claim 1 or claim 2 including the step of observing displacement if any, of the corona from a datum and deriving from said observation a signal alternative to said first signal, and utilising said alternative signal to initiate disabling of the electro chemical machine tool.

* * * * *

UNITED STATES PATENT AND TRADEMARK OFFICE
CERTIFICATE OF CORRECTION

PATENT NO. : 4,387,009

DATED : June 7, 1983

INVENTOR(S) : Charles S. GARDNER, Robert B. PRICE & Keith G. TILLEN

It is certified that error appears in the above-identified patent and that said Letters Patent is hereby corrected as shown below:

On The Title Page Item
[30] Delete "Feb. 12, 1980" and insert --December 2, 1980--.

Signed and Sealed this

Sixteenth Day of August 1983

[SEAL]

*Attest:*

GERALD J. MOSSINGHOFF

*Attesting Officer*  *Commissioner of Patents and Trademarks*